United States Patent
Frederick et al.

(10) Patent No.: US 10,875,503 B2
(45) Date of Patent: Dec. 29, 2020

(54) SYSTEM AND METHOD FOR ANTI-THEFT CONTROL FOR AUTONOMOUS VEHICLE

(71) Applicant: TOYOTA MOTOR ENGINEERING & MANUFACTURING NORTH AMERICA, INC., Erlanger, KY (US)

(72) Inventors: Scott L. Frederick, Brighton, MI (US); Scott P. Robison, Dexter, MI (US); Adam D. Holmstrom, Pinckney, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 365 days.

(21) Appl. No.: 15/863,912

(22) Filed: Jan. 6, 2018

(65) Prior Publication Data

US 2019/0210567 A1    Jul. 11, 2019

(51) Int. Cl.
*B60R 25/34* (2013.01)
*B60R 25/102* (2013.01)
*B60R 25/10* (2013.01)
*B60R 25/31* (2013.01)
*G05D 1/00* (2006.01)
*B60R 25/30* (2013.01)

(52) U.S. Cl.
CPC .............. *B60R 25/34* (2013.01); *B60R 25/10* (2013.01); *B60R 25/102* (2013.01); *B60R 25/305* (2013.01); *B60R 25/31* (2013.01); *G05D 1/0061* (2013.01); *G05D 1/0088* (2013.01); *B60R 2025/1016* (2013.01)

(58) Field of Classification Search
CPC ....... B60R 25/34; B60R 25/10; B60R 25/102; B60R 25/305; B60R 25/31; B60R 2025/1016; G05D 1/0061; G05D 1/0088
USPC ........................................................ 701/23
See application file for complete search history.

(56) References Cited

U.S. PATENT DOCUMENTS

| 6,956,479 B2 | 10/2005 | Kelsch et al. |
| 8,558,889 B2 | 10/2013 | Martin et al. |

(Continued)

FOREIGN PATENT DOCUMENTS

| CN | 202279085 U | 6/2012 |
| CN | 202406228 U | 8/2012 |

(Continued)

*Primary Examiner* — Paula L Schneider
(74) *Attorney, Agent, or Firm* — Oblon, McClelland, Maier & Neustadt, L.L.P.

(57) ABSTRACT

A method and a system for theft prevention from an autonomous vehicle are provided. The method includes acquiring data from one or more sensors associated with the autonomous vehicle and analyzing, using processing circuitry, the data to determine whether one or more exterior systems of the autonomous vehicle are tampered with. An alert is output to an electronic device associated with a user of the vehicle when a whether one or more exterior systems of the autonomous vehicle are tampered with. Further, an alert is output the user that the autonomous vehicle is no longer safe to be operated when at least one of the one or more exterior systems tampered with belongs to a predefined category. Further, a signal is output to the vehicle to control one or more systems of the vehicle when whether one or more exterior systems of the autonomous vehicle are tampered with.

18 Claims, 5 Drawing Sheets

(56) References Cited

U.S. PATENT DOCUMENTS

| | | | | |
|---|---|---|---|---|
| 8,816,853 | B1* | 8/2014 | Kelsch | G08B 13/1454 |
| | | | | 340/568.2 |
| 8,854,197 | B2* | 10/2014 | Ikeda | G08G 1/165 |
| | | | | 340/425.5 |
| 9,646,428 | B1 | 5/2017 | Konrardy et al. | |
| 9,646,472 | B2* | 5/2017 | Rosny | G01R 27/02 |
| 9,688,244 | B2 | 6/2017 | Martin et al. | |
| 10,185,999 | B1* | 1/2019 | Konrardy | G07C 5/008 |
| 10,242,665 | B1* | 3/2019 | Abeloe | G10L 13/047 |
| 2006/0103529 | A1 | 5/2006 | Ohmura et al. | |
| 2008/0042809 | A1* | 2/2008 | Watts | B60R 25/33 |
| | | | | 340/426.16 |
| 2010/0128126 | A1* | 5/2010 | Takeuchi | G08B 13/1961 |
| | | | | 348/143 |
| 2014/0192191 | A1 | 7/2014 | Sayegh et al. | |
| 2016/0375862 | A1* | 12/2016 | Ito | G08B 13/00 |
| | | | | 348/148 |
| 2019/0066032 | A1* | 2/2019 | Taveira | G06Q 10/083 |

FOREIGN PATENT DOCUMENTS

| | | |
|---|---|---|
| CN | 204680073 U | 9/2015 |
| JP | 2006321357 A | 11/2006 |
| JP | 2009280109 A | 12/2009 |

* cited by examiner

SYSTEM AND METHOD FOR ANTI-THEFT CONTROL FOR AUTONOMOUS VEHICLE

BACKGROUND

Autonomous vehicles are being developed at a rapid rate. Autonomous vehicles include sensors and radars that are very costly. The sensors and radars may be attached to an outer surface of an autonomous vehicle. U.S. Pat. No. 6,956,479 B2 entitled "Sensors and methods for detecting attachment to a surface" by Kelsch et al. describes sensors and methods for detecting attachment to a surface.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a theft prevention method that acquires data from one or more sensors associated with an autonomous vehicle and analyzes, using processing circuitry, the data to determine whether one or more exterior systems of the autonomous vehicle are tampered with. An alert is output to an electronic device associated with a user of the vehicle when an incident has occurred. Further, an alert is output to the user that the autonomous vehicle is no longer safe to be operated when at least one of the one or more exterior systems tampered with belongs to a predefined category. Further, a signal is output to the vehicle to control one or more systems of the vehicle when an incident has occurred.

The present disclosure relates to a theft prevention system. The system includes processing circuitry. The processing circuitry is configured to acquire data from one or more sensors associated with an autonomous vehicle, analyze the data to determine whether one or more exterior systems of the autonomous vehicle are tampered with, output an alert to an electronic device associated with a user of the vehicle when one or more exterior systems of the autonomous vehicle are tampered with, and output a signal to the vehicle to control one or more systems of the vehicle when one or more exterior systems of the autonomous vehicle are tampered with. Further, an alert is output to the user that the autonomous vehicle is no longer safe to be operated when at least one of the one or more exterior systems tampered with belongs to a predefined category.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
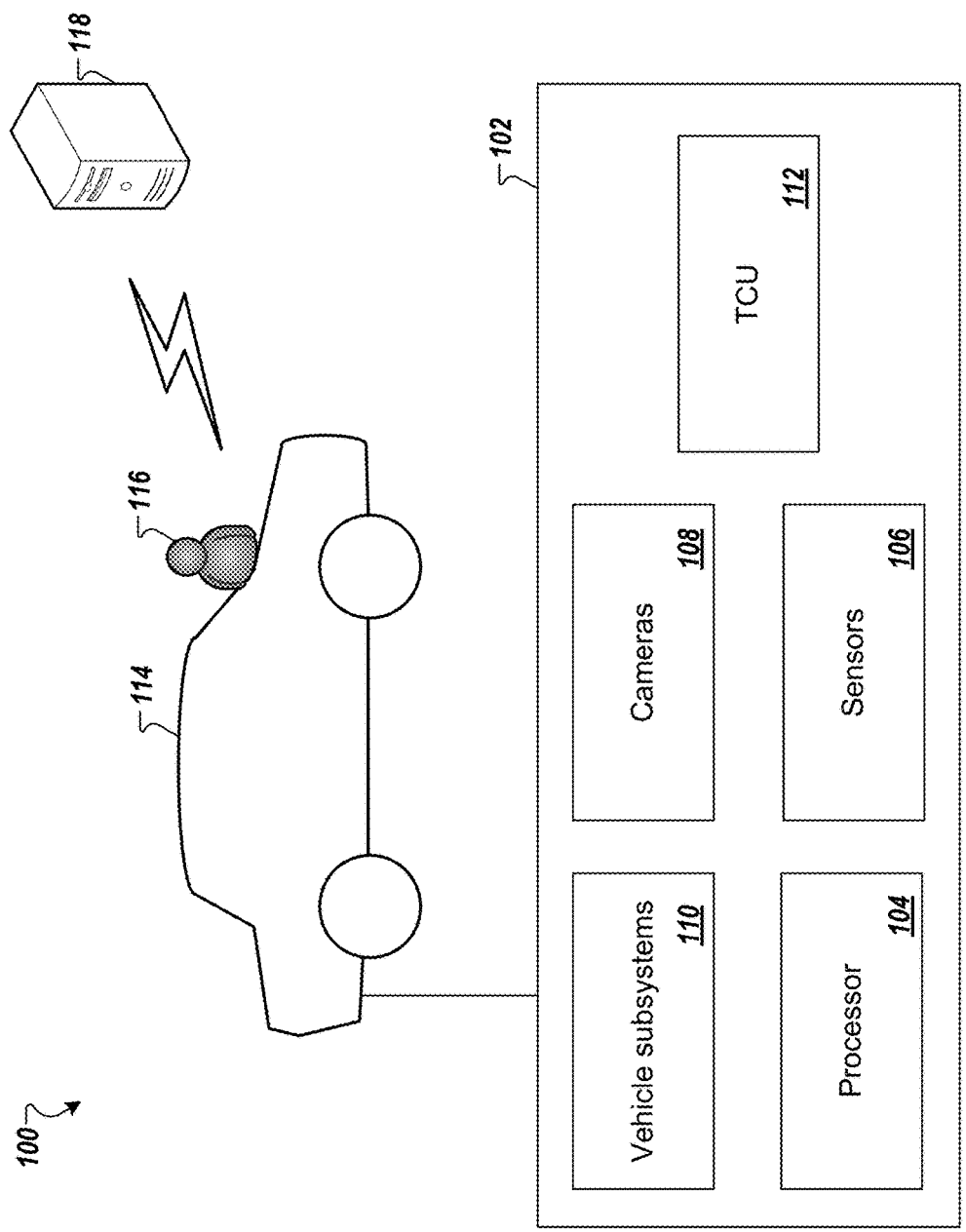
FIG. 1 is a schematic of a system environment according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a system and associated methodology for anti-theft control in an autonomous vehicle.

The autonomous vehicle includes sensors and radars that are attached by bolts and screws to the outer surface of the autonomous vehicle. The bolts and screws can be easily accessed by others. The anti-theft system described herein deters other from attempting to steal the sensors, electrical components, and radars. In addition, the anti-theft system provides evidence of the crime in the event that a theft occurs.

FIG. 1 is a schematic of a system environment 100 according to one example. The system 102 may include a processor 104, sensors 106, cameras 108, vehicle subsystems 110, and a telematics module 112. The telematics module 112 may be a direct communication module (DCM) that provides communications over a network to any server that may be included with multiple services available to a vehicle user 116. For example, the telematics module 112 may connect to a monitor server 118 associated with the vehicle manufacturer or to the police. The network may be a cellular network.

Vehicle 114 may be of any type of cars, trucks, sport utility vehicles, vans, mini-vans, automotive vehicles, commercial vehicles, agricultural vehicles, construction vehicles, specialty vehicles, recreational vehicles, buses, motorcycles, boats, yachts, or other types of vehicles. The vehicle may be gas-powered, diesel powered, electric, or solar-powered. The vehicle 114 may be partially or completely autonomous or self-driving.

The processor 104 may receive data from the sensors 106 and analyze the data to determine whether a sensor has been removed or an attempt to remove the sensor is in progress. The processor 104 may send a signal to the vehicle user 116 to alert disconnectivity. In addition, the processor 104 may control the vehicle subsystems 110.

The cameras 108 may be the cameras used by the autonomous operating systems or additional cameras. The cameras 108 may include still and/or video cameras. The cameras 108 may be infrared cameras. The cameras 108 may be coupled to the vehicle 114 in any suitable fashion and location such as to capture the surrounding of the vehicle 114. The cameras 108 may be activated when an attempt to remove one or more sensors is detected. For example, the cameras 108 may be activated when one or more motion detectors are triggered. The cameras 108 may send periodically or continuously video streams and/or still photos to the processor 104 and/or the monitor server 118.

Figure 2:
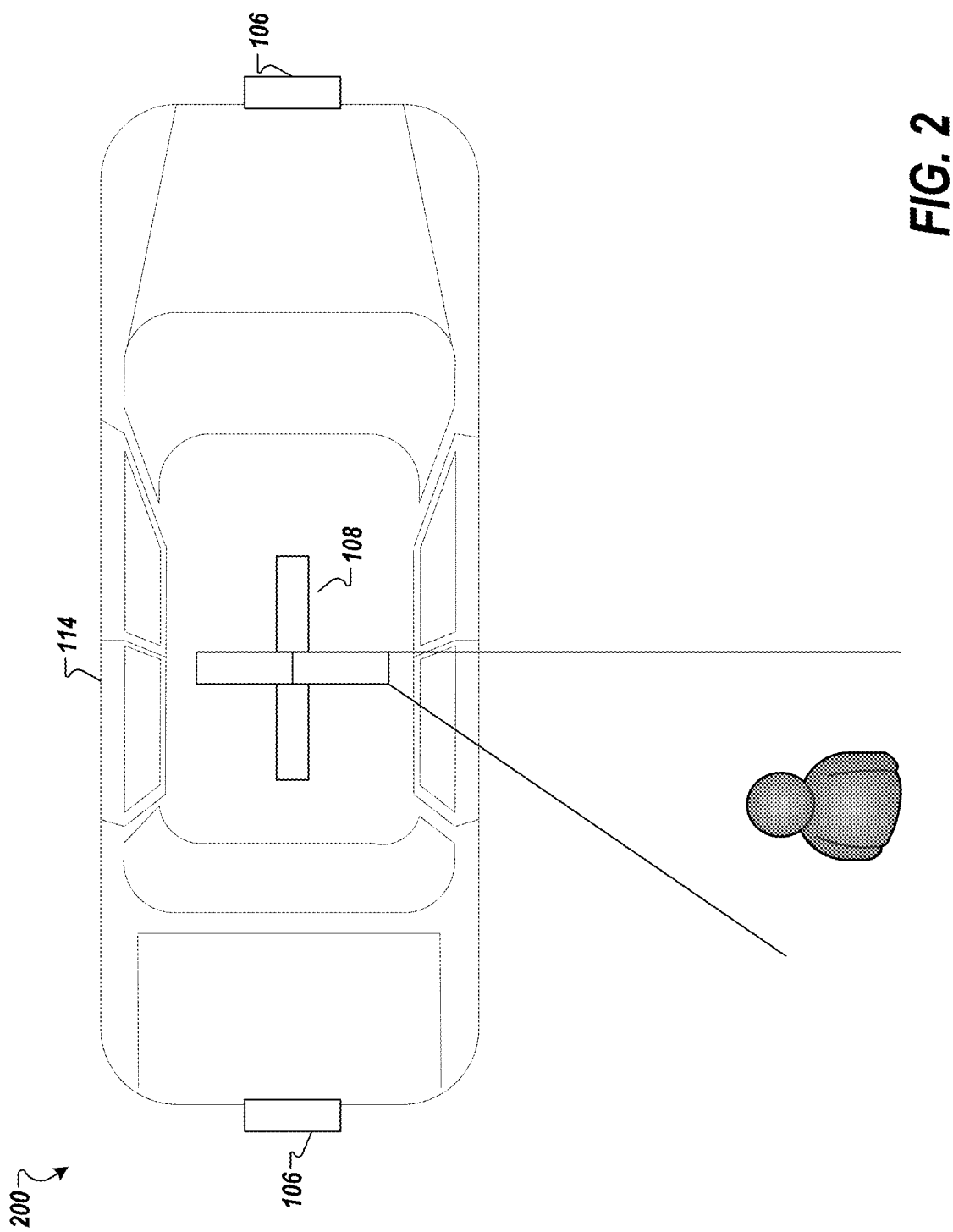
FIG. 2 is a schematic that shows sensors positioned on an outer surface of a vehicle according to one example.

The sensors 106 may be any sensor that may be mounted on the outer surface of the vehicle (e.g., top of the vehicle). FIG. 2 is a schematic 200 that shows the sensors 106 and the cameras 108 positioned on the outer surface of the vehicle 114. The sensors may include lasers, sonar, radar, and other sensors that scan and record data from the autonomous vehicle's environment. Sensor data from one or more of the sensors 106 may be used to detect objects and characteristics (e.g., position, shape, heading, speed) associated with the objects. In one implementation, the sensors 106 may upload data to the monitor server 118. The sensors 106 may upload data to the monitor server 118 at predetermined periods. Additionally or alternatively, the monitor server 118 may poll the sensors 106 at predetermined periods. A signal from a sensor 106 may be sent to the monitor server 118 when a circuit associated with the sensor 106 is disrupted, for example, by removing the sensor or a part of the sensor 106.

The vehicle 114 may also include an audio/visual alarm. The audio/visual alarm may be activated by the processor 104. The audio alarm may include a loud noise, a siren, or a prerecorded message broadcast via a speaker. The speaker is loud enough to be heard within a predetermined radius. The visual alarm may include activating vehicle lights in a flash mode.

The vehicle subsystems 110 may include a brake subsystem, a suspension subsystem, a steering subsystem, and a powertrain subsystem. The processor 104 may control any one or more of the vehicle subsystems 110 by outputting signals to control units and modules associated with the vehicle subsystems 110.

The modules and units described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

Figure 3:
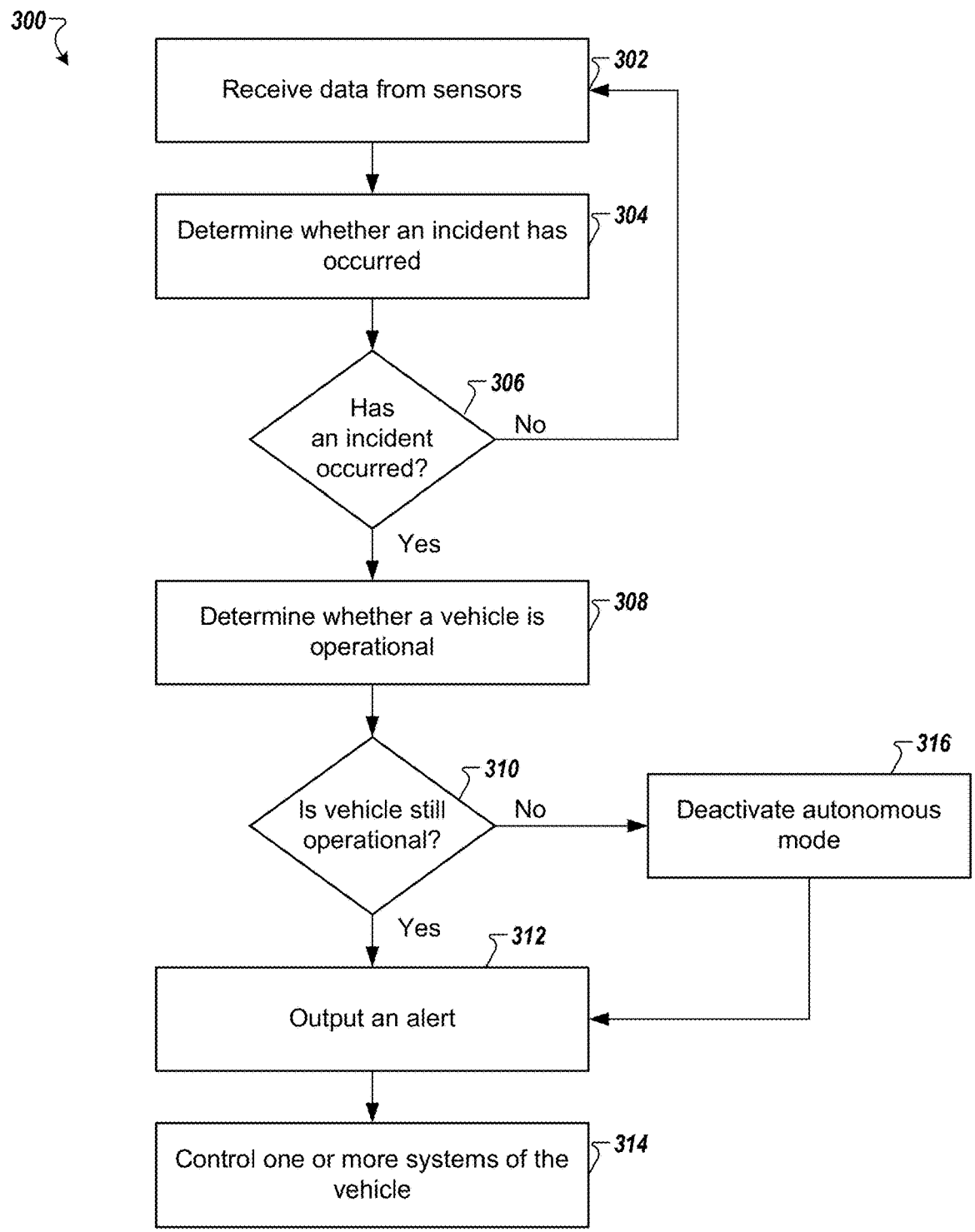
FIG. 3 is a flowchart for an anti-theft process according to one example.

FIG. 3 is a flowchart for an anti-theft process 300 according to one example. Process 300 may be implemented by the monitor server 118.

At step 302, the monitor server 118 may receive data from the sensors 106. As described previously herein, the sensors 106 may upload data to the monitor server 118 periodically and/or the monitor server 118 may prompt the sensors 106 to upload data periodically.

In one implementation, the sensors are activated when a camera or a LIDAR operating in a passive mode detects an individual within a predetermined radius. This provides the advantage of saving battery power when the vehicle is parked or moving at a speed below a predetermined speed threshold (e.g., below 15 mph).

In one implementation, the cameras 108 may be placed into a "watch" mode when the vehicle is parked. In the watch mode, the cameras 108 may continuously record the environment. Data from the recordings may be purged when no foul play is detected. For example, the processor 104 may purge data at predetermined periods (e.g., one hour) when no theft or attempts of tampering with one or more sensors are detected.

In one implementation, the cameras 108 may be activated when an individual is detected within a predetermined radius of the vehicle 114. For example, a motion sensor may detect an individual within the predetermined radius and send a control signal to the cameras 108 to start recording the environment.

At step 304, the monitor server 118 may analyze the data to determine whether an incident has occurred. The incident may be an attempt to remove one or more exterior systems of the vehicle such as a sensor or a part of a sensor or the removal of the sensor or a part of the sensor. The monitor server 118 may determine that an incident has occurred when a connection between the monitor server 118 and the sensor is lost. For example, the data received from the sensors at step 302 may be missing data from a particular sensor. The monitor server 118 may check to see whether data from all the sensors 106 are received.

The monitor server 118 may also monitor data to determine whether data received from a sensor is valid. This provides the advantages of detecting when an individual try to bypass one part. Thus, the monitor server 118 recognizes a broken circuit and false data received from a sensor.

At step 306, in response to determining that an incident has occurred, the process proceeds to step 308. In response to determining that an incident did not occur, the process proceeds to step 302.

At step 308, the monitor server 118 may determine whether the vehicle is operational in an autonomous mode by checking whether the sensor removed or tampered with affect the safe operation of the vehicle 114. The monitor server 118 may use a look-up table stored in a memory of the monitor server 118 to determine whether the safety of the operation of the vehicle is affected. The look-up table may store an association between each sensor and the safety of the operation of the vehicle. In one implementation, the monitor server 118 may check to see whether the one or more exterior systems tampered with belong to a predefined category. For example, if the LIDAR (light detection and ranging) system is tampered with, the vehicle may not be safe to be operated autonomously.

At step 310, in response to determining that the vehicle is still operational in the autonomous mode, the process proceeds to step 312. In response to determining that the vehicle is not operational in the autonomous mode, the process proceeds to step 316.

At step 312, the monitor server 118 may output an alert to the vehicle user 116. The alert may be output to the police or other authorities. The alert may include a recording or a still photo of the individual attempting the removal of the sensor, a location of the vehicle, and date and time of when the incident occurred. In one implementation, the monitor server 118 may send a signal to the processor 104 that causes the processor 104 to activate the audio/visual alarm such as a loud audible alert.

At step 314, the monitor server 118 may send a signal to the processor 104 to control one or more subsystems 110 of the vehicle 114. In one implementation, the processor 104 may activate the autonomous driving mode and move the vehicle 114 to a new location to stop the individual from removing the sensor.

At step 316, the monitor server 118 may output a signal to the processor 104 to disable one or more vehicle subsystems 110. For example, the processor 104 may deactivate the autonomous mode. Further, an alert message may be output to the user via a head unit of the vehicle or an electronic device associated with the vehicle user indicating that the vehicle is not safe to be operated in the autonomous mode. In one implementation, a message may be output to the user that indicates which subsystem is not operational.

In one implementation, process 300 may be implemented by the processor 104.

Figure 4:
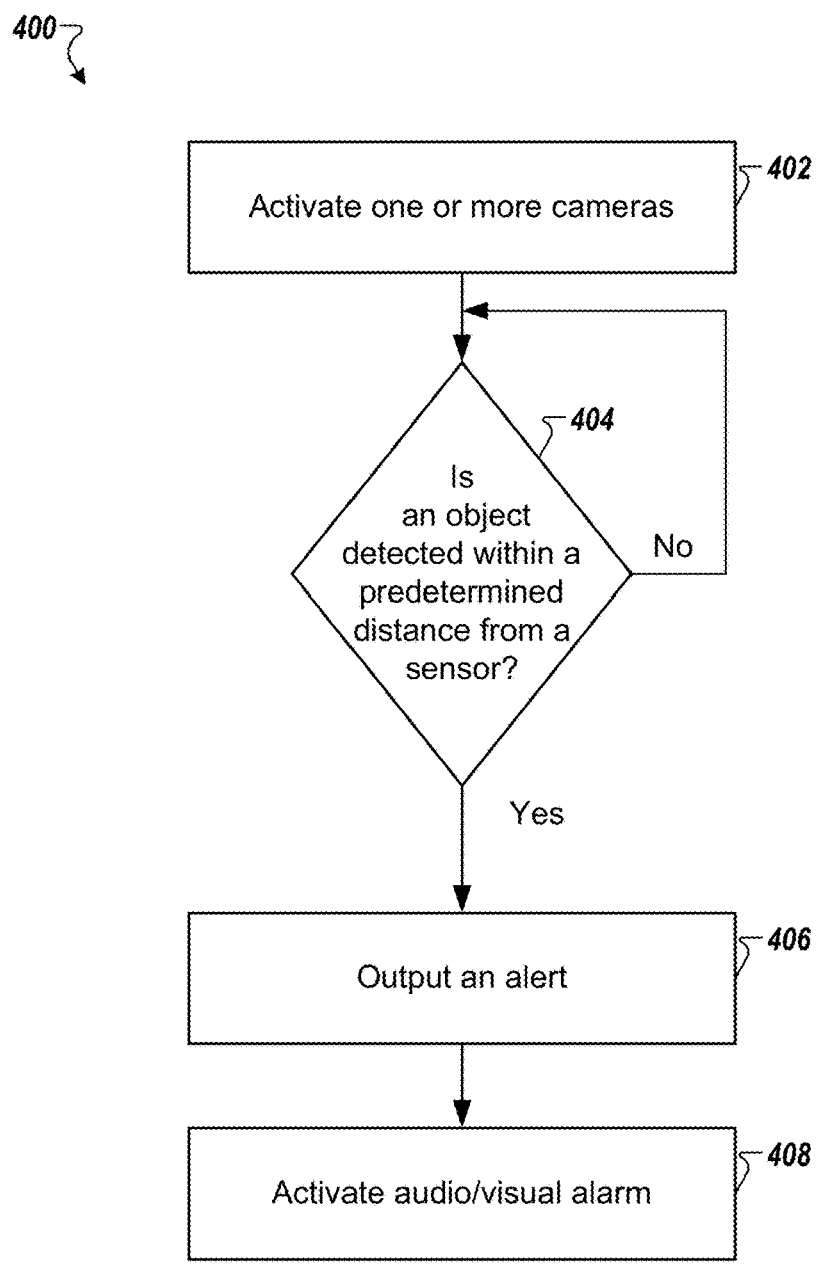
FIG. 4 is a flowchart for a watch mode process according to one example.

FIG. 4 is a flowchart for a "watch" mode process 400 according to one example. The watch mode process 400 may be implemented by the processor 104. The "watch" mode may be activated when the vehicle is parked or moving at a speed below a predetermined threshold. At step 402, the one or more cameras may be activated by the processor 104. As described previously herein, the one or more cameras may be activated when an object is detected within a first predetermined distance from the vehicle. At step 404, the processor 104 may check to see whether the object detected is within a second predetermined distance from each sensor (e.g., 1 ft, 2 ft, or the like). In response to determining that the object is within the second predetermined distance from a sensor, the process proceeds to step 406. In response to determining that the object is not within the second predetermined distance from any sensor, the process proceeds to step 402.

At step 406, the processor 104 may output the alert to the electronic device associated with the user or to an electronic device associated with a third-party.

In one implementation, the processor 104 may use image recognition techniques to determine whether the detected object is an individual. The processor 104 may not output the alert in response to determining that the object is not an individual. For example, the processor 104 may not output the alert when the detected object is an animal (e.g., cat). Further, the processor 104 may activate the alert when the detected object is other than an animal such as a cutting tool.

In one implementation, the processor 104 may further check to see whether the individual is the owner of the vehicle. The processor 104 may not output the alert in response to determining that the individual is the owner. The processor 104 may determine whether the individual is the owner by detecting an identification card (e.g., RF card) or key.

At step 408, the processor 104 may activate the audio/visual alarm. In one example, the processor 104 may also control the autonomous driving mode to move the vehicle from a current location to a new location to deter the individual from tampering with the sensors 106.

Figure 5:
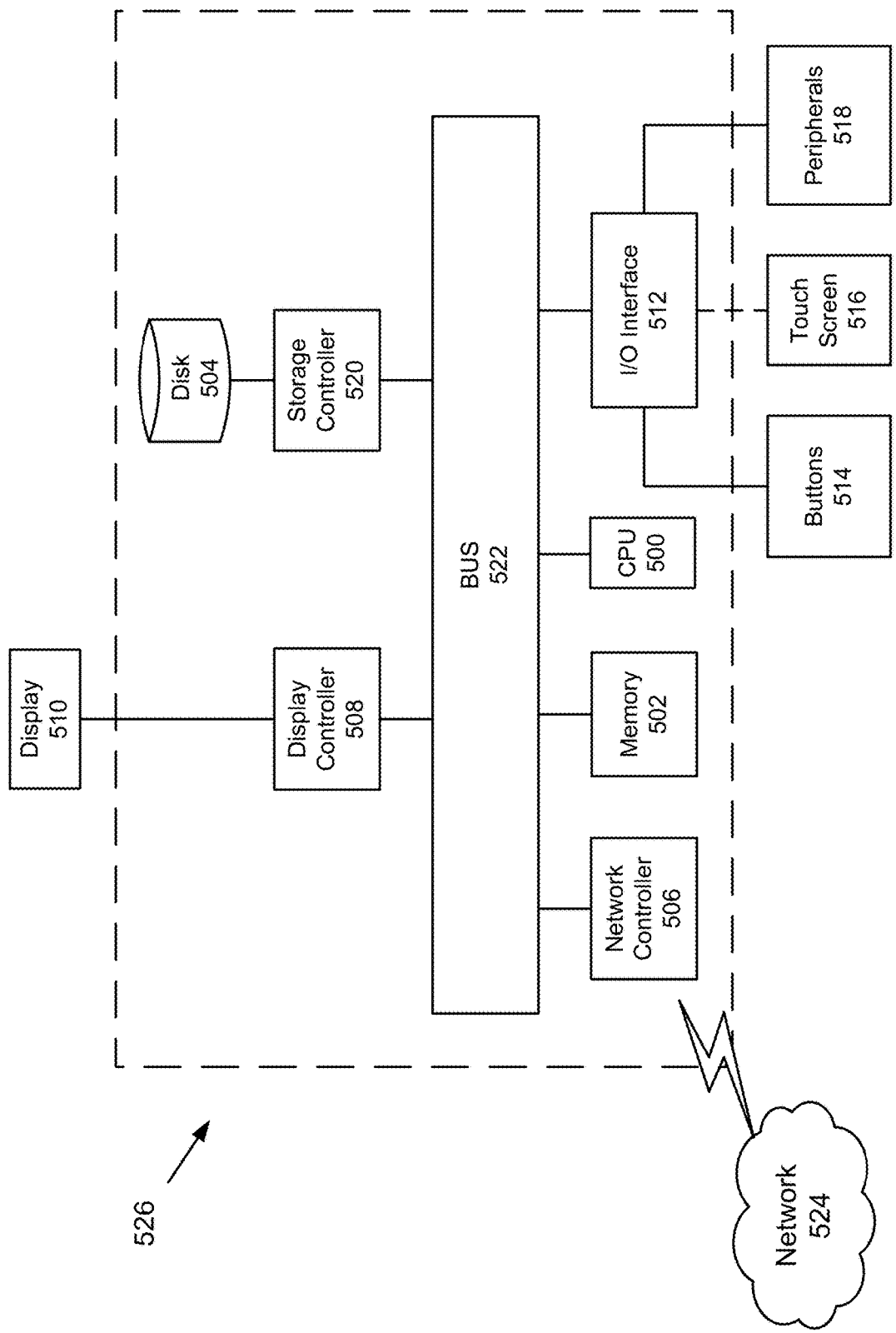
FIG. 5 is a block diagram of a processor according to one example.

In one implementation, the functions and processes of the monitor server 118 may be implemented by a computer 526. Next, a hardware description of the computer 526 according to exemplary embodiments is described with reference to FIG. 5. In FIG. 5, the computer 526 includes a CPU 500 which performs the processes described herein. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 526 communicates, such as a server or computer.

Further, the claimed advancements may be provided as a utility application, background daemon, or component of an operating system, or combination thereof, executing in conjunction with CPU 500 and an operating system such as Microsoft® Windows®, UNIX®, Oracle® Solaris, LINUX®, Apple macOS® and other systems known to those skilled in the art.

In order to achieve the computer 526, the hardware elements may be realized by various circuitry elements, known to those skilled in the art. For example, CPU 500 may be a Xenon® or Core® processor from Intel Corporation of America or an Opteron® processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The computer 526 in FIG. 5 also includes a network controller 506, such as an Intel Ethernet PRO network interface card from Intel Corporation of America, for interfacing with network 524. As can be appreciated, the network 524 can be a public network, such as the Internet, or a private network such as LAN or WAN network, or any combination thereof and can also include PSTN or ISDN sub-networks. The network 524 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 526 further includes a display controller 508, such as a NVIDIA® GeForce® GTX or Quadro® graphics adaptor from NVIDIA Corporation of America for interfacing with display 510, such as a Hewlett Packard® HPL2445w LCD monitor. A general purpose I/O interface 512 interfaces with a keyboard and/or mouse 514 as well as an optional touch screen panel 516 on or separate from display 510. General purpose I/O interface also connects to a variety of peripherals 518 including printers and scanners, such as an OfficeJet® or DeskJet® from Hewlett Packard®.

The general purpose storage controller 520 connects the storage medium disk 504 with communication bus 522, which may be an ISA, EISA, VESA, PCI, or similar, for interconnecting all of the components of the computer 526. A description of the general features and functionality of the display 510, keyboard and/or mouse 514, as well as the display controller 508, storage controller 520, network controller 506, and general purpose I/O interface 512 is omitted herein for brevity as these features are known.

A system which includes the features in the foregoing description provides numerous advantages to users. In particular, the system prevents the theft of costly sensors and cameras of an autonomous vehicle. Further, the system described herein improves the technological field of autonomous vehicles by increasing the safety of the vehicle.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for theft prevention from an autonomous vehicle, the method comprising:
    acquiring data from one or more sensors associated with the autonomous vehicle;
    analyzing, using processing circuitry, the data to determine whether one or more exterior systems of the autonomous vehicle are tampered with;
    outputting an alert to an electronic device associated with a user of the autonomous vehicle when one or more exterior systems are tampered with;
    alerting the user, via a message sent to a device associated with the user, that the autonomous vehicle is no longer safe to be operated when at least one of the one or more exterior systems tampered with belongs to a predefined category; and
    outputting a signal to the autonomous vehicle to control one or more systems of the autonomous vehicle when the one or more exterior systems of the autonomous vehicle are tampered with.

2. The method of claim 1, further comprising:
    activating a watch mode when the autonomous vehicle is parked.

3. The method of claim 1, wherein the controlling the one or more systems include activating an autonomous mode of the vehicle.

4. The method of claim 3, wherein activating the autonomous mode of the vehicle includes moving the vehicle from a first location to a second location.

5. The method of claim 1, wherein the controlling the one or more systems include activating an audio/visual alarm.

6. The method of claim 1, wherein the analyzing the data includes determining whether the acquired data is valid.

7. The method of claim 1, further comprising:
    deactivating the autonomous mode when the vehicle is not safely operational in the autonomous mode.

8. The method of claim 1, wherein the one or more sensors are positioned on an outer surface of the vehicle.

9. The method of claim 1, further comprising:
    activating one or more cameras of the vehicle when an individual is detected within a predetermined distance of the vehicle; and
    outputting recordings of the one or more cameras when an incident has occurred to an electronic device associated with a third party.

10. The method of claim 1, further comprising:
    activating one or more cameras of the vehicle when an individual is detected within a predetermined distance of the vehicle; and
    activating an audio/visual alarm.

11. A system for theft prevention from an autonomous vehicle, the system comprising:
    processing circuitry configured to
        acquire data from one or more sensors associated with the autonomous vehicle;
        analyze the data to determine whether one or more exterior systems of the autonomous vehicle are tampered with;
        output an alert to an electronic device associated with a user of the autonomous vehicle when one or more exterior systems are tampered with;
        alert the user, via a message sent to a device associated with the user, that the autonomous vehicle is no longer safe to be operated when at least one of the one or more exterior systems tampered with belongs to a predefined category; and
        output a signal to the autonomous vehicle to control one or more systems of the autonomous vehicle when the one or more exterior systems of the autonomous vehicle are tampered with.

12. The system of claim 11, wherein the controlling the one or more systems include activating an autonomous mode of the vehicle.

13. The system of claim 12, wherein activating the autonomous mode of the vehicle includes moving the vehicle from a first location to a second location.

14. The system of claim 11, wherein the controlling the one or more systems include activating an audio/visual alarm.

15. The system of claim 11, wherein the analyzing the data includes determining whether the acquired data is valid.

16. The system of claim 11, wherein the processing circuitry is further configured to:
    deactivate the autonomous mode when the vehicle is not operational in the autonomous mode.

17. The system of claim 11, wherein the processing circuitry is further configured to:
    activate one or more cameras of the vehicle when an individual is detected within a predetermined distance of the vehicle; and
    output recordings of the one or more cameras when an incident has occurred to an electronic device associated with a third party.

18. A non-transitory computer readable medium storing computer-readable instructions therein which when executed by a computer cause the computer to perform a method for theft prevention from an autonomous vehicle, the method comprising:
    acquiring data from one or more sensors associated with the autonomous vehicle;

analyzing the data to determine whether one or more exterior systems of the autonomous vehicle are tampered with;

outputting an alert to an electronic device associated with a user of the vehicle when one or more exterior systems are tampered with;

alerting the user, via a message sent to a device associated with the user, that the autonomous vehicle is no longer safe to be operated when at least one of the one or more exterior systems tampered with belongs to a predefined category; and outputting a signal to the autonomous vehicle to control one or more systems of the autonomous vehicle when the one or more exterior systems of the autonomous vehicle are tampered with.

* * * * *